(12) United States Patent
Rolling

(10) Patent No.: US 9,605,557 B1
(45) Date of Patent: Mar. 28, 2017

(54) VARIABLE BYPASS TURBOFAN ENGINE

(71) Applicant: The United States of America, as represented by the Secretary of the Air Force, Washington, DC (US)

(72) Inventor: August J Rolling, Colorado Springs, CO (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 420 days.

(21) Appl. No.: 14/231,947

(22) Filed: Apr. 1, 2014

Related U.S. Application Data

(60) Provisional application No. 61/817,595, filed on Apr. 30, 2013, provisional application No. 61/817,429, filed on Apr. 30, 2013.

(51) Int. Cl.
| | | |
|---|---|---|
| *F01D 17/00* | (2006.01) | |
| *F02K 3/02* | (2006.01) | |
| *F02C 7/36* | (2006.01) | |
| *B64C 11/32* | (2006.01) | |

(52) U.S. Cl.
CPC ............ *F01D 17/00* (2013.01); *B64C 11/325* (2013.01); *F02C 7/36* (2013.01); *F02K 3/02* (2013.01); *F05D 2220/36* (2013.01)

(58) Field of Classification Search
CPC . B64C 11/325; F02C 7/36; F02K 3/00; F02K 3/02; F05D 2220/36
See application file for complete search history.

(56) References Cited

U.S. PATENT DOCUMENTS

| | | | |
|---|---|---|---|
| 2,571,848 A | | 10/1951 | Ehlers |
| 2,735,499 A | | 2/1956 | Ehlers |
| 2,832,192 A | | 4/1958 | Budish |
| 4,033,119 A | | 7/1977 | Nichols |
| 4,147,024 A | | 4/1979 | Moellmann |
| 4,151,714 A | | 5/1979 | Scrace |
| 4,222,243 A | | 9/1980 | Mobsby |
| 4,799,354 A | * | 1/1989 | Midgley ................... F02C 7/26 416/32 |
| 4,803,837 A | | 2/1989 | Simmons |
| 5,205,712 A | * | 4/1993 | Hamilton ................ B64C 11/44 416/155 |
| 5,775,092 A | | 7/1998 | Hines |
| 6,508,055 B2 | | 1/2003 | Hubbard |
| 6,688,552 B2 | | 2/2004 | Franchet et al. |

(Continued)

OTHER PUBLICATIONS

Rolls-Royce LiftSystem Pamphlet. 2012. 4 Pgs.

*Primary Examiner* — Audrey K Bradley
(74) *Attorney, Agent, or Firm* — AFMCLO/JAZ; Jason Sopko

(57) ABSTRACT

A variable bypass turbofan engine includes a bypass fan having a plurality of bypass fan blades mated to a first low pressure shaft segment. A second low pressure shaft segment includes a low pressure compressor and a low pressure turbine mated thereto. The engine also includes a clutch coupled between the first low pressure shaft segment and the second low pressure shaft segment and is configured to selectively couple and decouple the first low pressure shaft segment from the second low pressure shaft segment. A brake is configured to selectively halt or oppose rotation of the first low pressure shaft segment or the bypass fan.

4 Claims, 2 Drawing Sheets

(56) References Cited

U.S. PATENT DOCUMENTS

| | | |
|---|---|---|
| 6,865,891 B2 | 3/2005 | Walsh et al. |
| 2007/0130913 A1* | 6/2007 | Harrison ............... B64C 11/001 60/226.3 |
| 2010/0154383 A1* | 6/2010 | Ress, Jr. ................... F02C 7/36 60/226.3 |

* cited by examiner

VARIABLE BYPASS TURBOFAN ENGINE

Pursuant to 37 C.F.R. §1.78(a)(4), this application claims the benefit of and priority to prior filed Provisional Application Ser. No. 61/817,595 (AFD 1265) and 61/817,429 (AFD 1266 and AFD 1267), both filed 30 Apr. 2013 which are expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to high efficiency jet engines and, more particularly, to turbofan jet engines.

BACKGROUND OF THE INVENTION

Many aircraft, particularly in military and unmanned roles, need to operate efficiently at more than one flight regime. For example, certain airframes are expected to perform in relatively high speed cruise modes, as well as slower loitering scenarios. Unfortunately, it is well established that an engine operates most efficiently when the exit velocity closely matches the speed of the airframe. As a result, designing an engine that is suitable for a plurality of roles, yields an engine that only performs moderately well at each of those operating conditions.

One approach to improve performance over a wider range of missions, is to add an additional flow path to the engine that can be turned on and off depending on the required operating requirements. While this method can produce acceptable results, current efforts are geometrically constrained by internal nacelle size. Such a constrained variable cycle engine can only vary its bypass ratio relatively slightly from a low to mid bypass ratio. A less constrained geometry would allow for large variations in bypass ratio allowing for an efficient high bypass turbofan to switch modes to a low bypass turbofan or even turbojet configuration.

If the aircraft needs to be efficient at both high subsonic Mach numbers such as supercruise at Machs greater than 1.6 as well as low subsonic Mach numbers for efficient loiter such as Machs between 0.7 and 0.9, a different approach is necessary to design an engine that can operate efficiently through a wider range of operational speeds. Current designs do not allow for the a user to select between a high bypass turbofan mode in order to operate efficiently at slow Mach numbers efficiently, and the option to turn off the high bypass portion of the engine in order to convert the engine into a low bypass turbofan (or even turbojet) to operate efficiently at higher Mach regimes.

Therefore, there a need exists for an improved variable bypass turbofan engine capable of selectively switching between high bypass and low bypass turbofan configurations.

SUMMARY OF THE INVENTION

The present invention overcomes the foregoing problems and other shortcomings, drawbacks, and challenges of designing an engine capable of producing improved fuel efficiency performance under a variety of operating conditions.

According to one embodiment of the present invention a variable bypass turbofan engine is provided. The engine includes a bypass fan having a plurality of bypass fan blades mated to a first low pressure shaft segment. A second low pressure shaft segment includes a low pressure compressor and a low pressure turbine mated thereto. The engine also includes a clutch coupled between the first low pressure shaft segment and the second low pressure shaft segment and is configured to selectively couple and decouple the first low pressure shaft segment from the second low pressure shaft segment. A brake is configured to selectively halt or oppose rotation of the first low pressure shaft segment or the bypass fan.

According to another embodiment of the disclosed invention a method of selectively reconfiguring a bypass turbofan engine into a turbojet engine is provided. The method includes disengaging a clutch to decouple a bypass fan and cooperating first low pressure shaft portion from a second low pressure shaft portion. The method further includes rotating a plurality of bypass fan blades about each of a plurality of pivot points to orient the bypass fan blades substantially parallel with a ram air flow. The method also includes applying a braking force to halt or oppose a rotation of the bypass fan.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
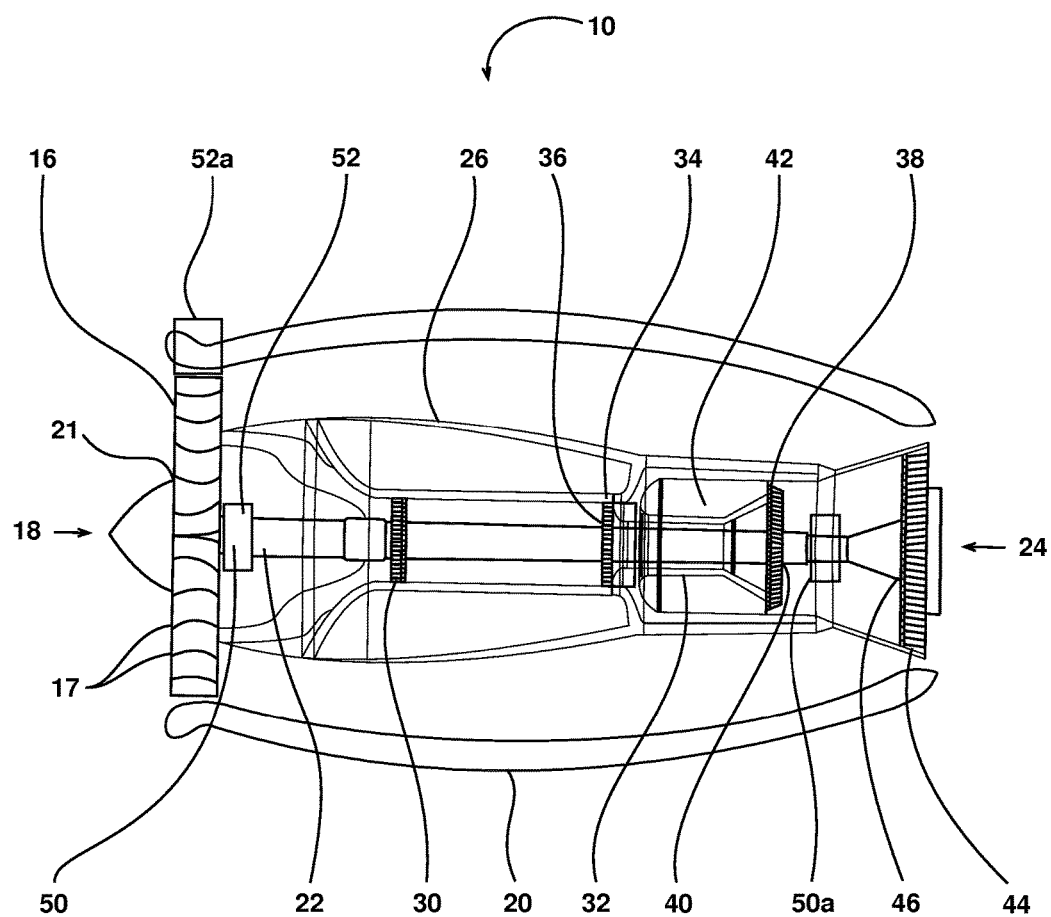
FIG. 1 is a partial cross sectional illustration of an embodiment of the disclosed invention.

FIG. 1 is a partial cross sectional illustration of an embodiment of the disclosed variable bypass turbofan engine. The engine 10, includes a bypass fan 16 disposed at the forward end 18 of the housing 20 (or nacelle for outboard engine). It is mated to the leading end 21 of low pressure shaft 22 that extends coaxially aft 24 within the housing 20 and within the core housing 26.

A low pressure compressor 30 is also mated to the low pressure shaft 22 aft of the bypass fan 16. Continuing aft 24, a high pressure shaft 32 is disposed coaxial with, and exterior to, the low pressure shaft 22. A high pressure compressor 34 is mated to the first end 36 of the high pressure shaft 32. A high pressure turbine 38 is mated to the second end 40 of the high pressure shaft 32. Between the high pressure compressor 34 and high pressure turbine 38 is a combustion region 42. This combustion region 42 includes fuel injection apparatus, and geometries conductive to ignition, as known by those of ordinary skill in the art. The final substantive component of is the low pressure turbine 44 mated near the trailing end 46.

The engine 10 also includes a clutch 50 that may be disposed aft 24 of the bypass fan 16. The clutch 50 is mated between two segments of the low pressure shaft 22 and is configured to selectively couple and decouple torque from the spinning low pressure shaft 22 to the bypass fan 16. The clutch 50 may be of any type as known to one of ordinary skill in the art, but clutches designed for coupling and decoupling Vertical Takeoff Or Landing or Short Takeoff Or Landing lifting thrust fans may be used. In the alternative, discretely or continuously variable transmissions may be used to gear the speed of the auxiliary fan from a maximum value equal to the speed of the low pressure shaft 22, to a minimum value of no rotation. In some embodiments of the disclosed invention, an alternate location of clutch 50a may be used to decouple the bypass fan 16 from the low pressure shaft 22. In a traditional jet engine, the bypass fan 16, low pressure compressor 30 and low pressure turbine 44 are all coupled to the same shaft. To facilitate decoupling of the bypass fan 16, while maintaining torque to the low pressure compressor 30, an additional coaxial shaft (not shown), may be disposed within the low pressure shaft 22 to transfer torque from the low pressure turbine 44 to the bypass fan 16.

A brake 52 may be incorporated into the housing of the clutch 50. The brake 52 may be applied to halt or oppose rotation of the bypass fan 16 when the clutch 50 is in a decoupled configuration. In an alternative location, the brake 52a is disposed at the periphery of the bypass fan 16. The brake 52a experiences a much smaller moment arm with respect to the rotating bypass 16 than when disposed as the brake 52, and the brake 52a may be reduced in size and robustness accordingly. When the engine 10 is underway and the brake 52 is applied, a significant axial load from ram air is transmitted to the low pressure shaft 22. Additionally, significant aerodynamic drag and distorted airflow result from the ram air striking the halted bypass fan blades 17. Therefore, additional structures may be used to compensate for these conditions.

Figure 2:
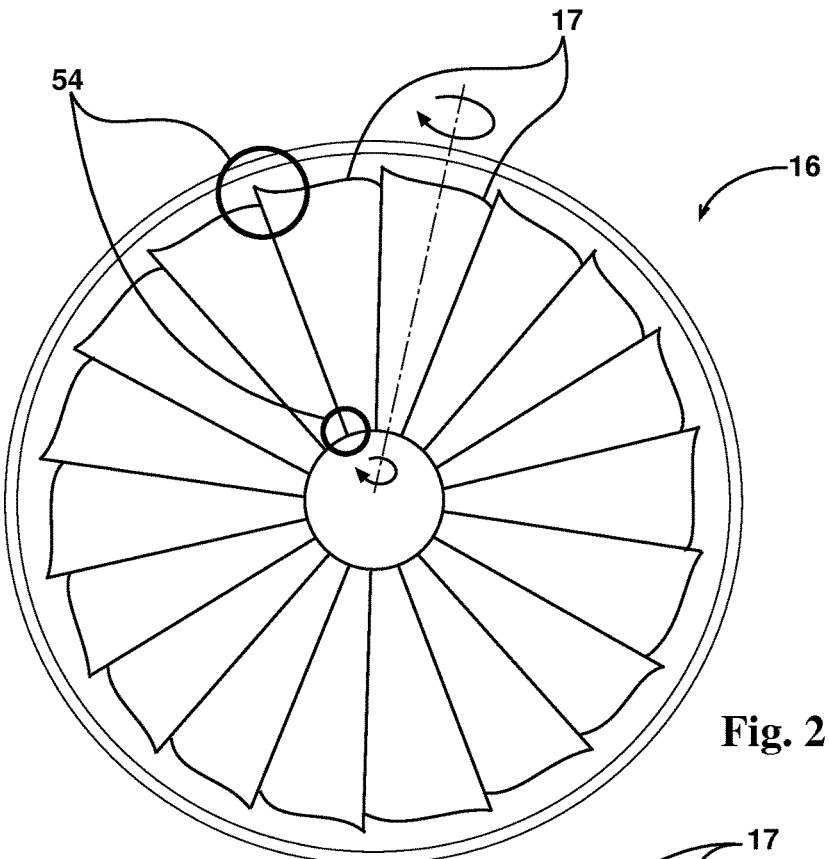
FIG. 2 is an end view illustration of a bypass fan of the disclosed invention in a first configuration.
Figure 3:
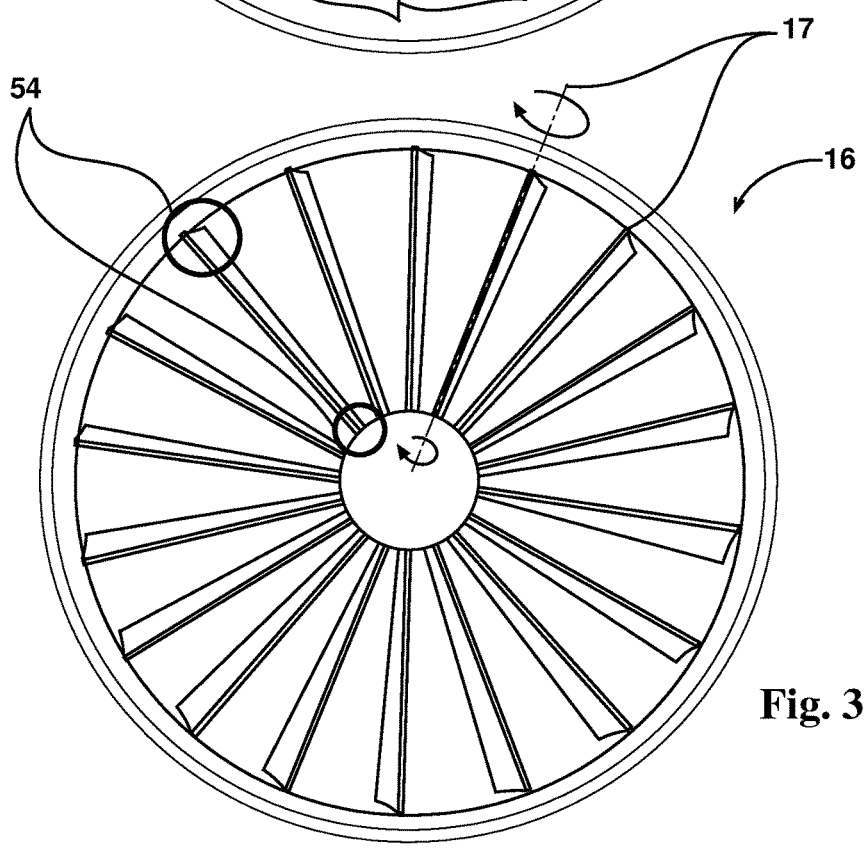
FIG. 3 is an end view illustration of a bypass fan of the disclosed invention in a second configuration.

Turning attention to FIG. 2, in one embodiment of the disclosed invention, the bypass fan 16 includes bypass fan blades 17 with adjustable pitch capability. In use, when the engine 10 is underway, the bypass fan blades 17 are angled to the same degree as found in bypass fans 16 known in the art. To convert the engine 10 from a bypass turbofan to a turbojet configuration, the clutch 50 (FIG. 1) is disengaged, and the brake 52 (FIG. 1) is applied. The bypass fan 16 is therefore decoupled from the low pressure shaft 22 (FIG. 1) and rotation is halted. Immediately thereafter, or concurrent with the application of the brake 52, the bypass fan blades 17 are rotated about their respective pivot points 54 to be substantially parallel with the incoming ram air. This is shown in FIG. 3. In this configuration, drag from the halted bypass fan 16 is substantially reduced. Additionally torque induced by the ram air's interaction with the bypass fan blades 17 decreases (thus reducing the stresses experienced by the brake 52, and airflow into the low pressure compressor 30 (FIG. 1) is highly uniform. The required feathering mechanism is enacted at the base of the blade using a mechanical actuator to rotate the blade passageways between those in FIG. 2 and FIG. 3. Additionally, this feathering mechanism may employ a feedback control system to set the pitch angle in response to conditions determined from measured altitude, Mach, aircraft angle of attack and pilot input.

The bypass fan blades 17 may be controlled by variable pitch mechanisms as known to those in the art familiar with feathering turboprop blades or helicopter rotor blades. Because each bypass fan blade 17 may be pivoted in a geared relationship with a centrally mounted or peripherally mounted adjusting feature, the overall quantity of bypass fan blade 17 may be reduced from the number traditionally used in bypass fans 16. As a result, the pitch or geometry of the bypass fan blades 17 may depart from traditional designs so as to yield comparable movement of air.

It should be noted that the sequence of manipulating the clutch 50, brake 52, or angle of the bypass fan blades 17 may be varied. In one example, bypass fan blades 17 may be adjusted first, then the clutch 50 may be disengaged, followed by application of the brake 52. It is believed that the following sequences provide superlative results. For switching from turbojet mode to turbofan mode, first feather the bypass fan blades 17 to initiate free spinning, then engage the clutch 50. This will decrease the overall torque experienced by the mechanism of the clutch 50. Conversely, to switch from turbofan mode to turbojet mode, the clutch 50 should first be disengaged prior to feathering the fan blades to minimize the load on the clutch 50, thus allowing the fan to slow via aerodynamic friction. While the previously describe sequences are desired, departures therefrom may be used to achieve design or mission objectives. Additionally, in lieu of, or in addition to, adjustable bypass fan blades 17, adjustable doors and ducts may be used to selectively redirect ram air from aft of the bypass fan 16 and into the low pressure compressor 30.

The engine 10 allows the pilot to select the configuration best suited to a given mission leg. High performance, high fuel consumption operation may be selected by disabling the bypass fan 16 and redirecting ram air to the low pressure compressor 30. In this configuration, ram air passing around the core housing 26 serves to cool the components contained therein. When the bypass fan 16 is activated, additional cool dense air is propelled around the core housing 26. This augmented propulsive air allows for reduced emissions from the core of the engine 10. Since engine noise is proportional to the $8^{th}$ power of exhaust velocity, noise emissions are reduced. Also, the low temperature ram air serves to cool the exhaust exiting the engine 10, thus reducing its thermal signature. The bypass air also cools the exhaust, thus reducing the thermal signature of the engine 10. The bypass air may also be used to cool other systems, wherein the relatively cool air serves as an effective heat sink.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A variable bypass turbofan engine, the engine comprising:
   a bypass fan having a plurality of bypass fan blades mated to a first low pressure shaft segment;
   a second low pressure shaft segment including a low pressure compressor and a low pressure turbine mated thereto;
   a clutch coupled between the first low pressure shaft segment and the second low pressure shaft segment and configured to selectively couple and decouple the first low pressure shaft segment from the second low pressure shaft segment; and
   a brake configured to selectively halt or oppose rotation of the first low pressure shaft segment or the bypass fan; wherein the brake is disposed proximate an outer circumference of the bypass fan.

2. The engine of claim 1, wherein each of the plurality of bypass fan blades are configured to adjustably and collectively rotate about a respective plurality of bypass fan blade pivot points.

3. The engine of claim 2, wherein the plurality of bypass fan blades are oriented parallel to a ram airflow.

4. A method of selectively reconfiguring a bypass turbofan engine into a turbojet engine, the method comprising:
   disengaging a clutch to decouple a bypass fan and cooperating first low pressure shaft portion from a second low pressure shaft portion;
   rotating each of a plurality of bypass fan blades about a respective plurality of pivot to orient the bypass fan blades parallel with a ram air flow; and
   applying a braking force proximate an outer circumference of the bypass fan to halt or oppose a rotation of the bypass fan.

* * * * *